Nov. 23, 1937.   O. MANKKI   2,100,012
BICYCLE
Filed May 29, 1936
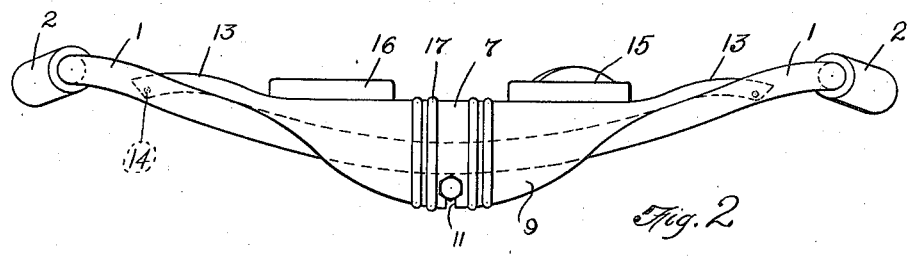
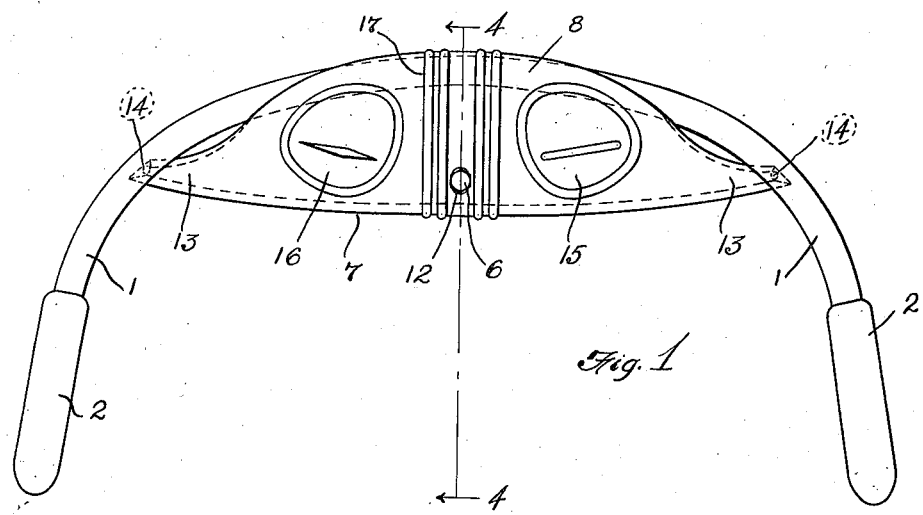
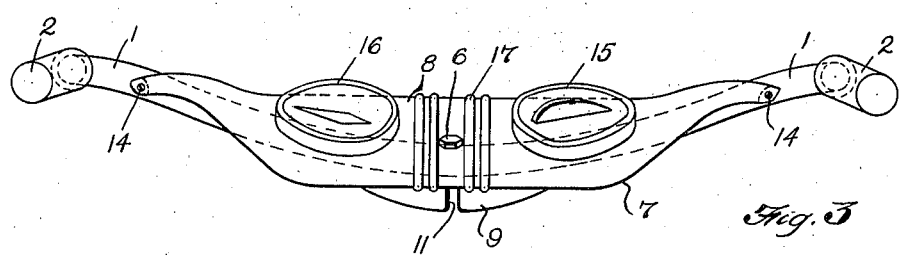
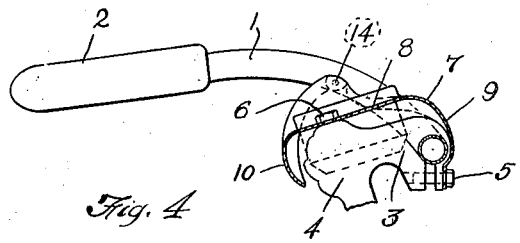
INVENTOR.
Onnie Mankki
BY Pay, Oberlin & Pay
ATTORNEYS.

Patented Nov. 23, 1937

2,100,012

UNITED STATES PATENT OFFICE 2,100,012

BICYCLE

Onnie Mankki, Cleveland Heights, Ohio, assignor to The Cleveland Welding Company, Cleveland, Ohio, a corporation of Ohio Application May 29, 1936, Serial No. 82,569

4 Claims. (Cl. 74—551.1)

This invention relates as indicated to bicycles and more particularly to the handle bar structure of bicycles and more especially to the provision of means in connection with the handle bars providing reinforcement for the same, as well as means for supporting suitable instruments in such position as to be most readily accessible to the user of the bicycle.

It is, therefore, a principal object of my invention to provide an instrument board for bicycles which serves not only as a means for supporting instruments and the like in a most desirable position with respect to the user but which also serves as a reinforcing means for the handle bar structure and in addition enhances the appearance in general of the bicycle.

Other objects of my invention will appear as the description proceeds.

To the accomplishment of the foregoing and related ends, said invention, then, consists of the means hereinafter fully described and particularly pointed out in the claims.

The annexed drawing and the following description set forth in detail certain structure embodying the invention, such disclosed means constituting, however, but one of various structural forms in which the principle of the invention may be used.

In said annexed drawing:—

Fig. 1 is a plan view of a device constructed in accordance with the principles of my invention; Fig. 2 is a front elevational view of the structure illustrated in Fig. 1; Fig. 3 is a rear elevational view of such structure; and Fig. 4 is a transverse sectional view of the structure illustrated in Fig. 1 taken on a plane substantially indicated by the line 4—4.

Referring now more specifically to the drawing, it will be noted that the handle bars generally indicated at 1 are of the usual type commonly employed in conjunction with a bicycle (not shown) and having hand grips 2 all of any suitable form of construction. Centrally of the handle bars 1, the same are engaged and secured in the bifurcated forwardly extending portion 3 of a conventional handle bar clamping post 4. The bifurcated terminal portion 3 is provided with the usual clamping bolt 5 whereby the handle bars are clamped in fixed relation with respect to the head 4.

Associated with the head 4 is the usual securing bolt 6 which extends axially downwardly into the head 4 for the purpose of securing such head to the front fork of the bicycle frame similarly to the bolt E shown in U. S. Patent No. 707,514. Since this construction is well known in the art as illustrated by the above identified patent, it is believed that a further description or a more complete illustration of the same is unnecessary.

The device to which my invention particularly relates is the apron 7 formed of any suitable material such as sheet metal and provided with a central enlarged area generally indicated at 8 which is provided with downwardly extending flanges 9 and 10 respectively along the forward and rear edges thereof.

The forward flange 9 is slotted as at 11, most clearly illustrated in Fig. 2, in order that such flange 9 may extend beneath the head of the clamping bolt 5 and be secured thereby.

The central portion of the apron has an opening 12 provided therein adapted to accommodate the clamping bolt 6 so that the latter may also secure the apron to the post 4.

The apron is also provided with laterally extending reduced projections 13 which extend underneath the handle bars 1 at opposite points respectively spaced from the clamping post 4 and any suitable means such as screws 14 may be provided for securing such extensions 13 to the handle bars.

In its enlarged central area the apron 7 provides support for one or more suitable instruments which, when two of such instruments are employed, may be arranged on opposite sides of the center line of the handle bars. Such instruments may be conveniently a lamp switch 15 and a compass 16 as illustrated; however, it will be apparent that any suitable instrument or instruments may be thus supported by the apron 7.

Extending longitudinally of the central enlarged portion 8 of the apron 7 there may be provided a plurality of ribs 17 for the purpose of stiffening and strengthening the apron and also enhancing its general appearance.

The above described form of construction characterized by the fact that the same is secured at spaced points to the handle bars, thus materially reinforces and strengthens the handle bar structure and thus making possible the elimination of the usual reinforcing cross bar between the handle bars employed for this purpose.

Other modes of applying the principle of my invention may be employed instead of the one explained, change being made as regards the structure herein disclosed, provided the means stated by any of the following claims or the equivalent of such stated means be employed.

I, therefore, particularly point out and distinctly claim as my invention:

1. The combination with a bicycle having handle bars and a handle bar clamping post, of a metallic apron overlying said post between said handle bars, means securing said apron to said post at spaced points and means securing said apron to said handle bars at points spaced from said post.

2. The combination with a bicycle having handle bars and a handle bar clamping post, of a metallic apron overlying said post between said handle bars, means securing said apron to said post at spaced points and means securing said apron to said handle bars at points spaced from said post, said apron in the area between said handle bars providing an instrument-supporting surface.

3. In a bicycle, the combination of a pair of handle bars, a clamping post securing said handle bars intermediately thereof, a metallic apron overlying said post and the central portion of said handle bars and provided with downwardly extending flanges respectively forwardly and rearwardly of said posts, means securing said apron to said post, said apron also provided with reduced lateral extensions extending under said handle bars at opposite points spaced from said post, and means securing said lateral extensions to said handle bars.

4. In a bicycle, the combination of a pair of convergent handle bars, a post having a bifurcated extension engaging the intermediate area of said handle bars, a clamping bolt extending through said bifurcated extension, a metallic apron overlying said post and provided with a downwardly extending flange engaged by said clamping bolt, said apron also provided with reduced lateral extensions extending under said handle bars at opposite points spaced from said post, and means securing said lateral extensions to said handle bars.

ONNIE MANKKI.